United States Patent
Russell et al.

(10) Patent No.: US 10,598,447 B2
(45) Date of Patent: *Mar. 24, 2020

(54) COMPOSITIONS CONTAINING NANO-BUBBLES IN A LIQUID CARRIER

(71) Applicant: Moleaer, Inc., Torrance, CA (US)

(72) Inventors: Warren Stuart Russell, Torrance, CA (US); Bruce Scholten, Torrance, CA (US)

(73) Assignee: Moleaer, Inc, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,218

(22) Filed: Sep. 6, 2019

(65) Prior Publication Data

US 2020/0003506 A1 Jan. 2, 2020

Related U.S. Application Data

(62) Division of application No. 15/456,077, filed on Mar. 10, 2017.

(Continued)

(51) Int. Cl.
*F28F 23/00* (2006.01)
*B01F 5/04* (2006.01)
(Continued)

(52) U.S. Cl.
CPC .......... *F28F 23/00* (2013.01); *B01F 3/04503* (2013.01); *B01F 5/043* (2013.01);
(Continued)

(58) Field of Classification Search
CPC ..................................................... F28F 23/00
See application file for complete search history.

(56) References Cited

U.S. PATENT DOCUMENTS 3,545,731 A * 12/1970 McManus ............. B01F 3/0446
261/122.1
4,992,216 A * 2/1991 Saita ..................... B01F 3/0446
261/122.1

(Continued)

FOREIGN PATENT DOCUMENTS

CN      204454721 U  *  7/2015
EP         0157594       10/1985
(Continued)

OTHER PUBLICATIONS

Baron and Nakagawa, "A tiny solution to a big problem: the use of nanobubbles in inhibiting silica scaling in geothermal systems," Proceedings, 42nd Workshop on Geothermal Reservoir Engineering, Feb. 2017.

(Continued)

*Primary Examiner* — Matthew D Krcha
(74) *Attorney, Agent, or Firm* — Fish & Richardson P.C.

(57) ABSTRACT

An apparatus for producing a composition that includes nano-bubbles dispersed in a liquid carrier includes: (a) an elongate housing comprising a first end and a second end, the housing defining a liquid inlet, a liquid outlet, and an interior cavity adapted for receiving the liquid carrier from a liquid source; and (b) a gas-permeable member at least partially disposed within the interior cavity of the housing. The gas-permeable member includes an open end adapted for receiving a pressurized gas from a gas source, a closed end, and a porous sidewall extending between the open and closed ends having a mean pore size no greater than 1.0 µm. The gas-permeable member defines an inner surface, an outer surface, and a lumen. The housing and gas-permeable member are configured to form a composition that includes the liquid carrier and the nano-bubbles dispersed therein.

28 Claims, 3 Drawing Sheets

Related U.S. Application Data

(60) Provisional application No. 62/306,637, filed on Mar. 11, 2016.

(51) Int. Cl.
    *B01F 3/04*           (2006.01)
    *C02F 1/68*           (2006.01)
    *C02F 1/72*           (2006.01)
    *C02F 7/00*           (2006.01)
    *B01F 5/00*           (2006.01)
    *F28F 19/00*         (2006.01)
    *F28C 3/00*          (2006.01)
    *F28C 1/00*          (2006.01)
    *F28F 13/02*         (2006.01)

(52) U.S. Cl.
    CPC .......... *B01F 5/0451* (2013.01); *B01F 5/0465* (2013.01); *B01F 5/0498* (2013.01); *C02F 1/685* (2013.01); *B01F 2003/04858* (2013.01); *B01F 2005/0017* (2013.01); *B01F 2005/0091* (2013.01); *B01F 2215/0431* (2013.01); *C02F 1/72* (2013.01); *C02F 7/00* (2013.01); *C02F 2301/024* (2013.01); *F28C 1/00* (2013.01); *F28C 3/00* (2013.01); *F28F 13/02* (2013.01); *F28F 19/00* (2013.01); *Y02W 10/15* (2015.05)

(56) References Cited

U.S. PATENT DOCUMENTS

| | | | |
|---|---|---|---|
| 5,151,187 A | | 9/1992 | Behmann |
| 5,415,891 A | | 5/1995 | Liu et al. |
| 5,674,433 A | | 10/1997 | Semmens et al. |
| 5,675,153 A | * | 10/1997 | Snowball ................ B01J 19/12 250/436 |
| 6,193,221 B1 | | 2/2001 | Sherman |
| 6,328,854 B1 | | 12/2001 | Sherman |
| 6,398,194 B1 | | 6/2002 | Tsai et al. |
| 7,496,692 B2 | | 2/2009 | Holm et al. |
| 7,591,452 B2 | | 9/2009 | Kohama et al. |
| 7,691,268 B2 | | 4/2010 | Yamasaki et al. |
| 8,186,653 B2 | | 5/2012 | Tsuji |
| 8,231,263 B2 | | 7/2012 | Windhab et al. |
| 8,317,165 B2 | | 11/2012 | Yamasaki et al. |
| 8,445,546 B2 | | 5/2013 | Wood et al. |
| 8,470,893 B2 | | 6/2013 | Wood et al. |
| 8,500,104 B2 | | 8/2013 | Spears et al. |
| 8,726,918 B2 | | 5/2014 | Watanabe |
| 8,906,241 B2 | | 12/2014 | Kerfoot |
| 8,919,747 B2 | | 12/2014 | Anzai et al. |
| 8,962,700 B2 | | 2/2015 | Wood et al. |
| 8,974,770 B2 | | 3/2015 | Chang et al. |
| 8,980,090 B2 | | 3/2015 | Choi et al. |
| 8,981,022 B2 | | 3/2015 | Shimoda |
| 9,107,711 B2 | | 8/2015 | Hainard |
| 9,308,505 B2 | | 4/2016 | Spears et al. |
| 9,364,438 B2 | | 6/2016 | Murata et al. |
| 9,416,329 B2 | | 8/2016 | Shiode et al. |
| 9,512,041 B2 | | 12/2016 | McEvoy et al. |
| 9,527,046 B1 | | 12/2016 | Roe |
| 2006/0284325 A1 | | 12/2006 | Kohama et al. |
| 2007/0189972 A1 | | 8/2007 | Chiba et al. |
| 2007/0284316 A1 | | 12/2007 | Yamasaki et al. |
| 2007/0286795 A1 | | 12/2007 | Chiba et al. |
| 2008/0237141 A1 | | 10/2008 | Kerfoot |
| 2009/0188721 A1 | | 7/2009 | Smith |
| 2010/0077650 A1 | | 4/2010 | Shiode et al. |
| 2010/0126702 A1 | | 5/2010 | Tsunemori et al. |
| 2011/0241230 A1 | | 10/2011 | Kerfoot |
| 2013/0096489 A1 | | 4/2013 | Hassan et al. |
| 2013/0175716 A1 | | 7/2013 | Weisshaar |
| 2014/0191425 A1 | * | 7/2014 | Yano ................... B01F 3/04262 261/124 |
| 2014/0238936 A1 | | 8/2014 | Fazel et al. |
| 2015/0048904 A1 | | 2/2015 | Zhou |
| 2016/0023187 A1 | | 1/2016 | Hedlund et al. |
| 2016/0066760 A1 | | 3/2016 | Citsay |
| 2019/0060223 A1 | | 2/2019 | Yanzi |

FOREIGN PATENT DOCUMENTS

| | | | |
|---|---|---|---|
| JP | 2013056318 A | * | 3/2013 |
| WO | WO 2012/082265 | | 6/2012 |
| WO | WO 2014/089443 | | 6/2014 |
| WO | WO 2014/140291 | | 9/2014 |
| WO | WO 2015/048904 | | 4/2015 |
| WO | WO-2015048904 A1 | * | 4/2015 |

OTHER PUBLICATIONS

Ebina et al., "Oxygen and Air Nanobubble Water Solution Promote the Growth of Plants, Fishes, and Mice," PLOS One, Jun. 2013, 8: e65339, 7 pages.

Enoch and Olesen, "Tansley Review No. 54 Plant response to irrigation with water enriched with carbon dioxide," New Phytol.,1993, 125: 249-258.

International Search Report and Written Opinion in International Application No. PCT/US17/21814, dated Jul. 10, 2017.

Kang et al., "Effects of drinking hydrogen-rich water on the quality of life of patients treated with radiotherapy for liver tumors," Medical Gas Research, 2011, 1:11, 8 pages.

Kanimozhi and Kokila, "An Experimental Study on the Effect of Membrane Bubble Technology on Plant Growth," National Conference on Research Advances in Communication, Computation, Electrical Science and Structures, 2015, 54-58.

Kodama and Hinatsu, "Fluid Dynamics Field-Drag Reduction of Ships," in Micro- and Nanobubbles: Fundamentals and Applications, Chapter 10, 2014, 289-301.

Koide and Xue, "Carbon microbubbles sequestration: a novel technology for stable underground emplacement of greenhouse gases into wide variety of saline aquifers, fractured rocks and tight reservoirs," Energy Procedia, 2009, 1: 3655-3662.

Koide et al., "Subterranean Containment and Long-Term Storage of Carbon Dioxide in Unused Aquifers and in Depleted Natural Gas Reservoirs," Energy Convers., 1992, 33: 619-626.

Liu et al., "Stimulating effect of nanobubbles on the reactive oxygen species generation inside barley seeds as studied by the microscope spectrophotometer," Proceedings International Conference of Agricultural Engineering, Jul. 2014, 8 pages.

Mano, "Homeostatic Function of Nanobubble Water," In Micro- and Nanobubbles: Fundamentals and Applications, Chapter 12, 2014, 57 pages.

Matsuki et al., "Oxygen supersaturated fluid using fine micro/nanobubbles," International Journal of Nanomedicine, 2014, 9: 4495-4505.

Minamikawa et al., "Irrigation with oxygen-nanobubble water can reduce methane emission and arsenic dissolution in a flooded rice paddy," Environ. Res. Lett., 2015, 10: 084012, 11 pages.

Nakao et al., "Effectiveness of Hydrogen Rich Water on Antioxidant Status of Subjects with Potential Metabolic Syndrome—An Open Label Pilot Study," J. Clin. Biochem. Nutr., Mar. 2010, 46: 140-149.

Nakatake et al., "Effect of nano air-bubbles mixed into gas oil on common-rail diesel engine," Energy, 2013, 59:233-239.

Oshita and Liu, "Nanobubble Characteristics and Its Application to Agriculture and Foods," Proceedings of AFHW, International Symposium on Agri-Foods for Health and Wealth, Aug. 2013, 23-32.

Palaniappan Arumugam, "Understanding the Fundamental Mechanisms of a Dynamic Micro-bubble Generator for Water Processing and Cleaning Applications," Thesis for the degree of Master of Applied Science, Department of Mechanical and Industrial Engineering, University of Toronto, 2015, 92 pages.

Tamaki et al., Experiment 2: Removal of Residual Pesticides in Vegetables Using Ozone Microbubbles, In Micro- and Nanobubbles: Fundamentals and Applications, Chapter 8.1.3, 2014, 5 pages.

Tsuge, "Characteristics of Microbubbles," In Micro- and Nanobubbles. Fundamentals and Applications, Chapter 1, 2014, 5 pages.

(56) References Cited

OTHER PUBLICATIONS

Tsutsumi et al., "Further Development of the Microbubble Generator to Improve the Potential for Oxygen Supply to the Water," In Micro- and Nanobubbles. Fundamentals and Applications, Chapter 8.2.4, 2014, 239-241.
www.sciencedaily.com [online]. "Bubbly drinks inspire more effective cancer treatment," Jun. 2016 [retrieved on Jul. 18, 2017] Retrieved from the Internet: <www.sciencedaily.com/releases/2016/06/160608100730.htm>. 3 pages.
Zimmerman et al., "Towards energy efficient nanobubble generation with fluidic oscillation," Current Opinion in Colloid & Interface Science, 2011, 17 pages.
Extended European Search Report in Application No. 17764194, dated Oct. 9, 2019, 9 pages.

\* cited by examiner

COMPOSITIONS CONTAINING NANO-BUBBLES IN A LIQUID CARRIER

CLAIM OF PRIORITY

This application is a divisional and claims priority to U.S. patent application Ser. No. 15/456,077 filed Mar. 10, 2017 which claims priority to U.S. Provisional Application Ser. No. 62/306,637, filed on Mar. 11, 2016, the entire contents of which are hereby incorporated by reference.

TECHNICAL FIELD

This invention relates to producing compositions that include a liquid carrier and nano-bubbles dispersed therein.

BACKGROUND

Nano-bubbles have several unique properties such as long lifetime in liquid due to their negatively charged surfaces. Nano-bubbles also have high gas solubility into the liquid due to their high internal pressure. Conversely, micro- and macro-bubbles are larger in size, and thus rise rapidly and burst at the water surface.

Nano-bubbles are applicable in variety of fields and can have numerous beneficial effects from a medical, industrial and agricultural point of view. For example, the presence of nano-bubbles can promote a physiological activity in creatures and increase metabolism, as a result of which ontogenetic growth is enhanced.

To date several methods of generating nano-bubbles have been proposed. These methods include swirl-type liquid flow, venturi, high-pressure dissolution, ejector, mixed vapor direct contact condensation and supersonic vibration. All of these methods are energy intensive and have varying degrees of success in creating nano-bubbles.

SUMMARY

As used herein, the term "nano-bubble" refers to a bubble that has a diameter of less than one micron. A microbubble, which is larger than a nano-bubble, is a bubble that has a diameter greater than or equal to one micron and smaller than 50 microns. A macro-bubble is a bubble that has a diameter greater than or equal to 50 microns.

In one aspect, there is described an apparatus for producing a composition that includes nano-bubbles dispersed in a liquid carrier. The apparatus includes (a) an elongate housing comprising a first end and a second end, the housing defining a liquid inlet, a liquid outlet, and an interior cavity adapted for receiving the liquid carrier from a liquid source; and (b) a gas-permeable member at least partially disposed within the interior cavity of the housing.

The gas-permeable member includes an open end adapted for receiving a pressurized gas from a gas source, a closed end, and a porous sidewall extending between the open and closed ends having a mean pore size no greater than 1.0 μm. The gas-permeable member defines an inner surface, an outer surface, and a lumen.

The liquid inlet of the housing is arranged to introduce the liquid carrier from the liquid source into the interior cavity of the housing at an angle that is generally orthogonal to the outer surface of the gas permeable member. The housing and gas-permeable member are configured such that pressurized gas introduced into the lumen of the gas-permeable member is forced through the porous sidewall of the gas-permeable member and onto the outer surface of the gas permeable member in the form of nano-bubbles as the liquid carrier from the liquid source flows parallel to the outer surface of the gas-permeable member from the liquid inlet to the liquid outlet, forming a composition that includes the liquid carrier and the nano-bubbles dispersed therein.

In some embodiments, the composition is essentially free of microbubbles when measured 10 minutes after emerging from the liquid outlet. A composition that is "essentially free of microbubbles" is a composition in which microbubbles make up less than 1% of the total bubble volume in the composition.

The nano-bubbles may have a mean diameter less than 500 nm or less than 200 nm, or ranging from about 10 nm to about 500 nm (e.g., from about 75 nm to about 200 nm). The concentration of nano-bubbles in the liquid carrier at the liquid outlet may be at least $1 \times 10^6$ nano-bubbles/ml, at least $1 \times 10^7$ nano-bubbles/ml, or at least $1 \times 10^8$ nano-bubbles/ml. In some embodiments, the composition includes nano-bubbles that are stable in the liquid carrier for at least one month or for at least three months under ambient pressure and temperature.

The gas may be selected from the group consisting of air, oxygen, carbon dioxide, nitrogen, hydrogen, and combinations thereof. In some embodiments, the gas-permeable member may be adapted to receive gas pressurized to at least 5 psi or at least 100 psi.

The liquid carrier may include water. In some embodiments, the liquid carrier is free of surfactants.

In some embodiments, the gas-permeable member includes a rigid, ceramic member. The porous sidewall may have a mean pore size ranging from 0.0009 μm to 1 μm. The porous sidewall may include a porous coating. Examples of suitable porous coating include metallic oxides such as alumina, titania, zirconia, manganese, and combinations thereof. The porous coating may be disposed on the inner surface, outer surface, or both surfaces of the gas-permeable member.

In some embodiments, the housing includes a plurality of gas-permeable members. The gas-permeable member may be in the form of a single channel tube, or a multi-channel tube.

The apparatus may include one or more helical members (or helical apparatuses) adapted for enhancing turbulence in the liquid carrier. In some embodiments, the apparatus may further include a jet pump that is integral with the housing.

In a second aspect, there is described an apparatus for producing a composition that includes nano-bubbles dispersed in a liquid carrier. The apparatus includes: (a) an elongate housing comprising a first end and a second end, the housing defining a liquid inlet, a liquid outlet, and an interior cavity adapted for receiving the liquid carrier from a liquid source; and (b) a gas-permeable tube disposed within the interior cavity of the housing.

The gas-permeable tube includes an open end adapted for receiving a pressurized gas from a gas source, a closed end, an inner surface, an outer surface, and a lumen. At least one of the inner and outer surfaces of the gas-permeable tube includes a porous coating having a mean pore size no greater than 1 μm selected from the group consisting of alumina, titania, zirconia, manganese, and combinations thereof.

The liquid inlet of the housing is arranged to introduce the liquid carrier from the liquid source into the interior cavity of the housing at an angle that is generally orthogonal to the outer surface of the gas-permeable tube. The housing and gas-permeable tube are configured such that pressurized gas introduced into the lumen of the gas-permeable tube is forced through the porous coating of the gas-permeable tube and onto the outer surface of the gas permeable tube in the form of nano-bubbles as the liquid carrier from the liquid source flows parallel to the outer surface of the gas-permeable member from the liquid inlet to the liquid outlet, forming a composition that includes the liquid carrier and the nano-bubbles dispersed therein.

In a third aspect, there is described a method for producing a composition containing nano-bubbles dispersed in a liquid carrier using the apparatuses described above. The method includes introducing a liquid carrier from a liquid source into the interior cavity of the housing through the liquid inlet of the housing at a flow rate that creates turbulent flow at the outer surface of the gas-permeable member. The method further includes introducing a pressurized gas from a gas source into the lumen of the gas-permeable member at a gas pressure selected such that the pressure within the lumen is greater than the pressure in the interior cavity of the housing, thereby forcing gas through the porous sidewall and forming nano-bubbles on the outer surface of the gas-permeable member. The liquid carrier flows parallel to the outer surface of the gas-permeable member from the liquid inlet to the liquid outlet, and removes nano-bubbles from the outer surface of the gas-permeable member to form a composition that includes the liquid carrier and the nano-bubbles dispersed therein.

The above-described compositions in which nano-bubbles are dispersed in a liquid carrier are useful in a number of applications. For example, the compositions can be used to treat water by transporting the composition to water in need of treatment. Examples of water sources that can be treated include wastewater, oxygen-deficient water, drinking water, and aquaculture water.

In another application, the above-described compositions can be combined with a liquid to create a pumpable composition having a viscosity that is less than the viscosity of the liquid, and then transporting the pumpable composition through a pipe to a desired destination. Examples of liquids include crude oil and drilling fluids.

In another application, the above-described composition is combined with a liquid to create an oxygen-enriched composition, which is then applied to plant roots to enhance plant growth.

In an exemplary method, nano-bubbles are produced by supplying gas under pressure to one side of a ceramic structure, said one side being coated with titanium oxide, aluminum oxide or other metallic oxide and the structure having a pore size of between 0.0009-1.0 µm, so that the gas passes through the ceramic structure and emerges as nano-bubbles on the other side thereof, and creating a liquid flow on said other side of the ceramic structure to carry away the nano-bubbles as they emerge from said structure, thereby preventing the nano-bubbles coalescing to bubbles of a larger size.

An exemplary apparatus for generating nano-bubbles includes a porous ceramic structure having a first surface and an opposed second surface, a gas supply system for supplying gas under pressure to said first surface of the ceramic structure so that the gas passes though the ceramic structure and emerges through said second surface and a liquid supply system for supplying liquid under pressure as a stream which flows over said second surface.

The ceramic structure can be in the form of a tube that is closed at one end and has an inlet for gas under pressure at the other end. The apparatus can further include an elongate housing co-axial with said tube having an inlet for liquid at one end and an outlet for liquid at the other end so that liquid flows through the cylindrical channel defined between the tube and the housing. The inlet to the housing can be positioned so that liquid flows into the housing at an angle to the direction of flow through the housing. Projections such as helical members can be provided in said housing for increasing turbulent flow in the channel.

The apparatus and method for forming nano-bubbles make it possible to form nano-bubbles using minimal energy, having a bubble diameter of not more than 1000 nm in a solution, in which the nano-bubbles remain dispersed in the liquid carrier for one or more months in a stable state under ambient temperature and pressure. High concentrations of nano-bubbles in a liquid carrier can be produced. Furthermore, depending upon the nature of the gas within the nano-bubbles, the solution containing the nano-bubbles therein can provide a physiological activation, and/or growth potentiating effect on animals, plants, organisms and/or microorganisms; a killing or anti-proliferative effect on microorganisms such as bacteria and viruses; a chemical reaction with an organic or inorganic substance; or a mixing of a gas with a liquid.

In addition, a great advantage of a composition containing gas carried in the nano-bubbles is that the nano-bubbles increase a saturation point in a liquid. The nano-bubbles in the composition increase a maximum saturated point of the liquid.

The details of one or more embodiments of the invention are set forth in the description below. Other features, objects, and advantages of the invention will be apparent from the description and from the claims.

DETAILED DESCRIPTION

Figure 1:
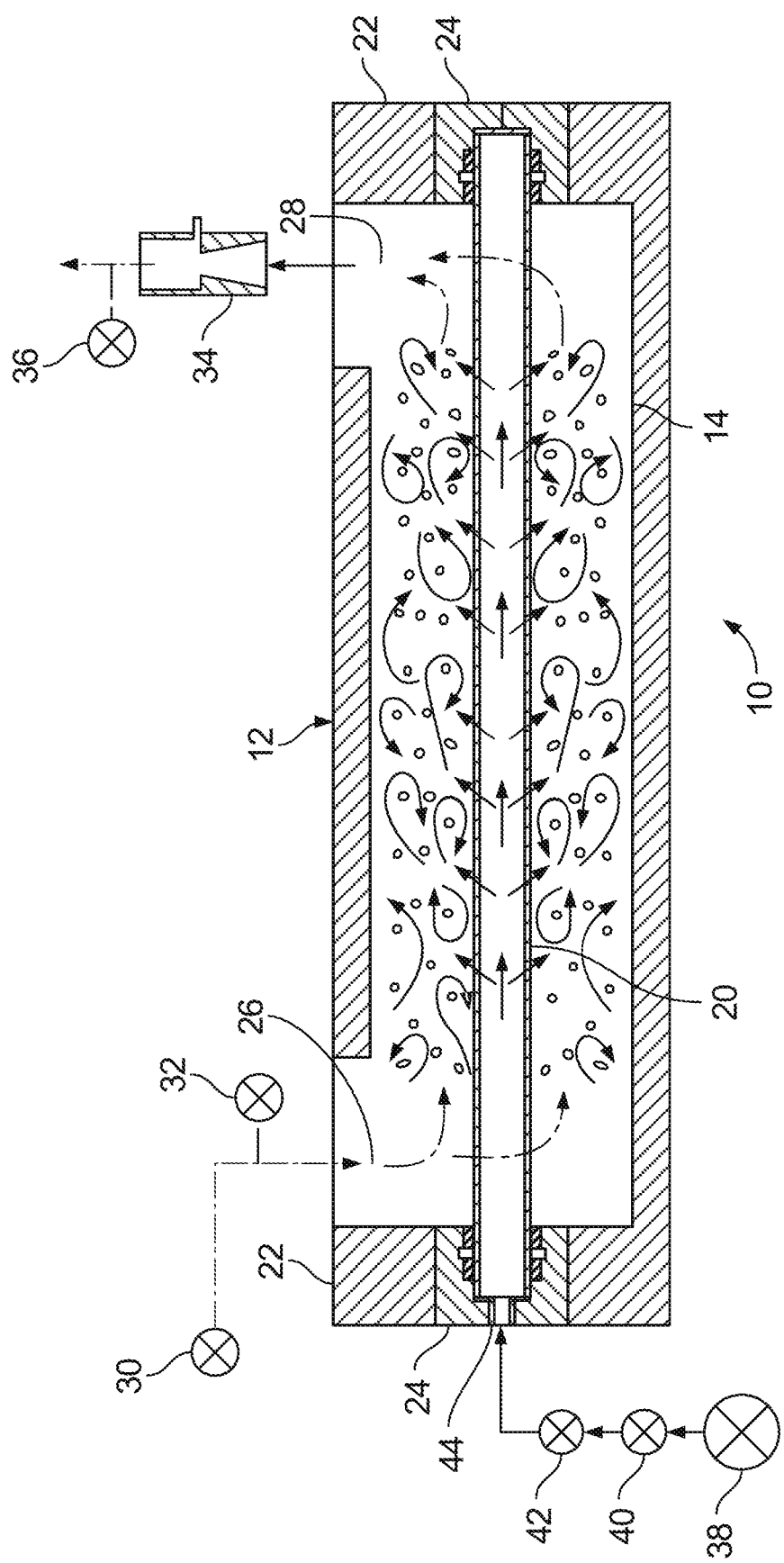
FIG. 1 is a schematic illustration of an example apparatus for producing a composition that includes nano-bubbles dispersed in a liquid carrier.

FIG. 1 shows an exemplary apparatus 10 that includes a housing 12 of cylindrical form.

A ceramic tube 20, which will be described in more detail below, spans between the end walls 22 of the housing 12, and is rigidly supported at both ends. Sealing structures 24 including O-rings are provided between the tube 20 and the end walls 22.

There is an inlet to the housing at 26 and an outlet from the housing at 28. A pump 30 is connected to the inlet 26 and there is a pressure regulator 32 between the pump 30 and the inlet 26.

A jet pump 34 and a pressure gauge 36 are connected to the outlet 28. The function of the jet pump 34 will be described below.

A source 38 of gas under pressure is connected via a pressure regulator 40 and a flow meter 42 to an inlet 44 to the tube 20. It will be noted that the tube 20 is closed at the end opposite to the inlet 44.

The tube 20 preferably includes a rigid material adapted for maintaining a constant pore size when its lumen is filled with a pressurized gas. For example, the tube 20 can be made of a material having sufficient strength or wall thickness for maintaining a constant pore size when a pressurized gas is introduced into the lumen of the tube 20. Maintaining a constant pore size can be beneficial for controlling the diameter range and mean diameter of the nano-bubbles formed in the composition.

The tube 20 can be a commercially available single channel ceramic membrane coated with metallic oxides (such as alumina, titania, zirconia, manganese, or combinations thereof). Utilizing a ceramic membrane for the production of nano-bubbles is not limited to any form or size of structure and can be in the form of a monolith, multichannel tubes, etc. A singular mean pore size of 0.9, 1, 3, 5, 10, 30, 70, 100, 200, 250, 400, 600, 800 and 1000 nm (0.0009-1.0 micron) is used depending on the size of the bubble desired. Examples of commercially available single channel ceramic membranes coated in either an $Al_2O_3$ or $TiO_2$ crystalline coating with a known mean pore size are those sold by Inopor GmbH. The tube can be up to 1-meter long, with a hollow lumen of at least 7 mm, and up to 36 mm, in some embodiments. An external diameter of a tube can range from about 10 mm to about 42 mm.

Figure 2:
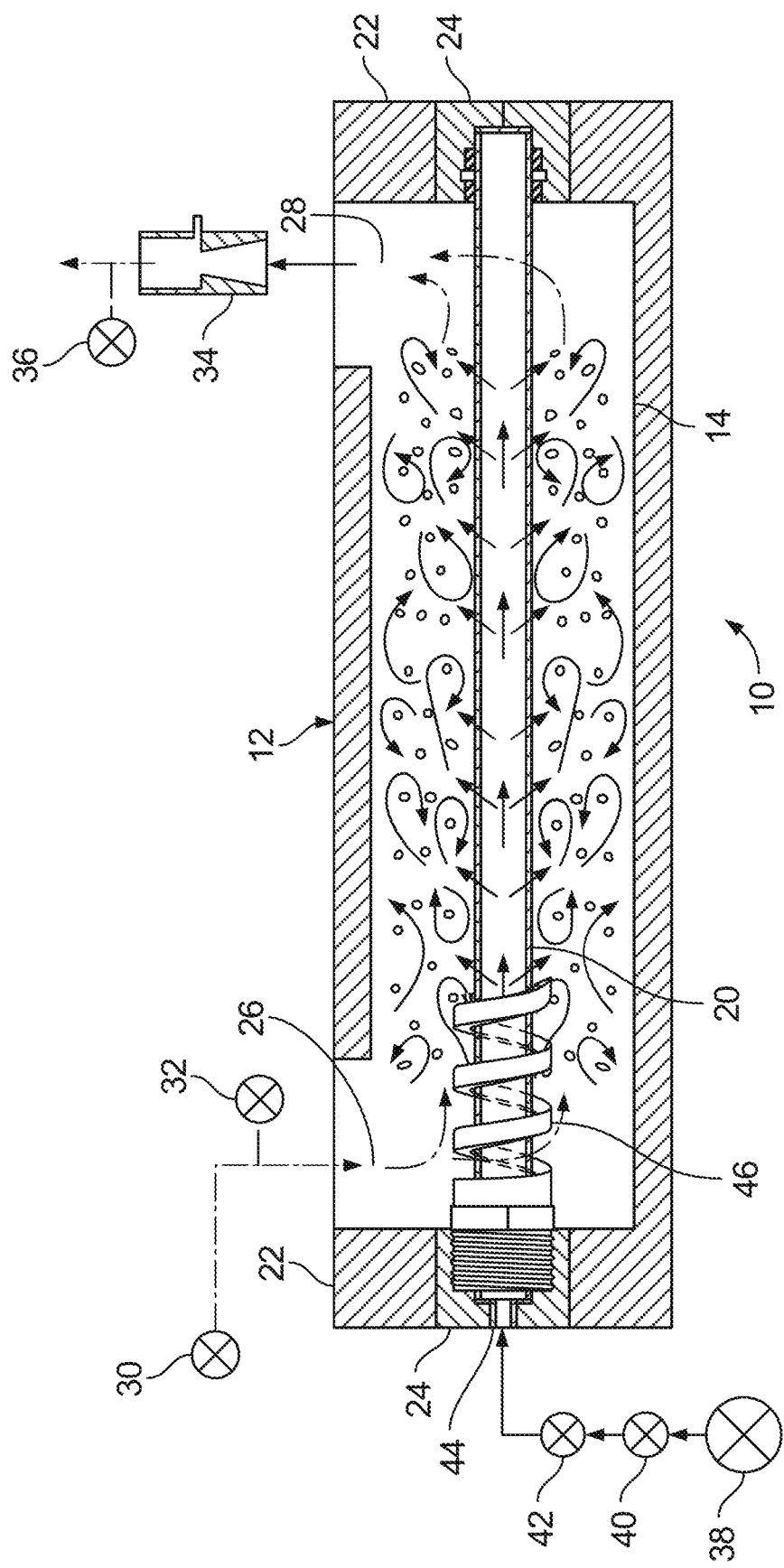
FIG. 2 is a schematic illustration of a second example apparatus for producing a composition that includes nano-bubbles dispersed in a liquid carrier.

A liquid, which will usually be water but could also be an organic liquid, is fed by the pump 30 into the inlet 26. The liquid may be free of surfactants. It will be noted that the inlet 26 is at right angles to the direction of flow though the housing 12. This results in the flow in the housing 12 being turbulent. It is possible to provide elements such as a helical member 46 in the apparatus 10 (see FIG. 2) that project into the flowing liquid and enhance the turbulence caused by the position of the inlet. The ceramic tube 20 and housing 12 can also be arranged and spaced respectively to one another to prevent clogging of the liquid.

Gas under pressure flows from the source 38 through the regulator 40 and the flow meter 42 to the inlet 44 of the tube 20. The gas can be oxygen, air, hydrogen, nitrogen, carbon dioxide, or combinations thereof. As the tube 20 is closed apart from at its inlet, the gas forced in can only escape through the pores of the tube. A pressure differential is maintained between the gas pressure inside the tube 20 and the liquid pressure outside the tube 20 so that gas is forced through the pores of the tube. It emerges as nano-bubbles into the turbulently flowing stream of liquid on the outside of the tube 20. This carries away the nano-bubbles as they form and before they can coalesce into large bubbles. The velocity of the liquid can be 2.0 m/s or greater (e.g., at least 2.0 m/s, or 3.0 m/s).

In some embodiments, the gas pressure inside the tube 20 is pressurized to at least 5 psi or at least 100 psi. Greater pressures may also be used.

The jet pump 34 permits another liquid or gas to be drawn through its side inlet into the flowing stream of nano-bubble rich liquid flowing through the jet pump 34 thereby to dose the flowing liquid.

Figure 3:
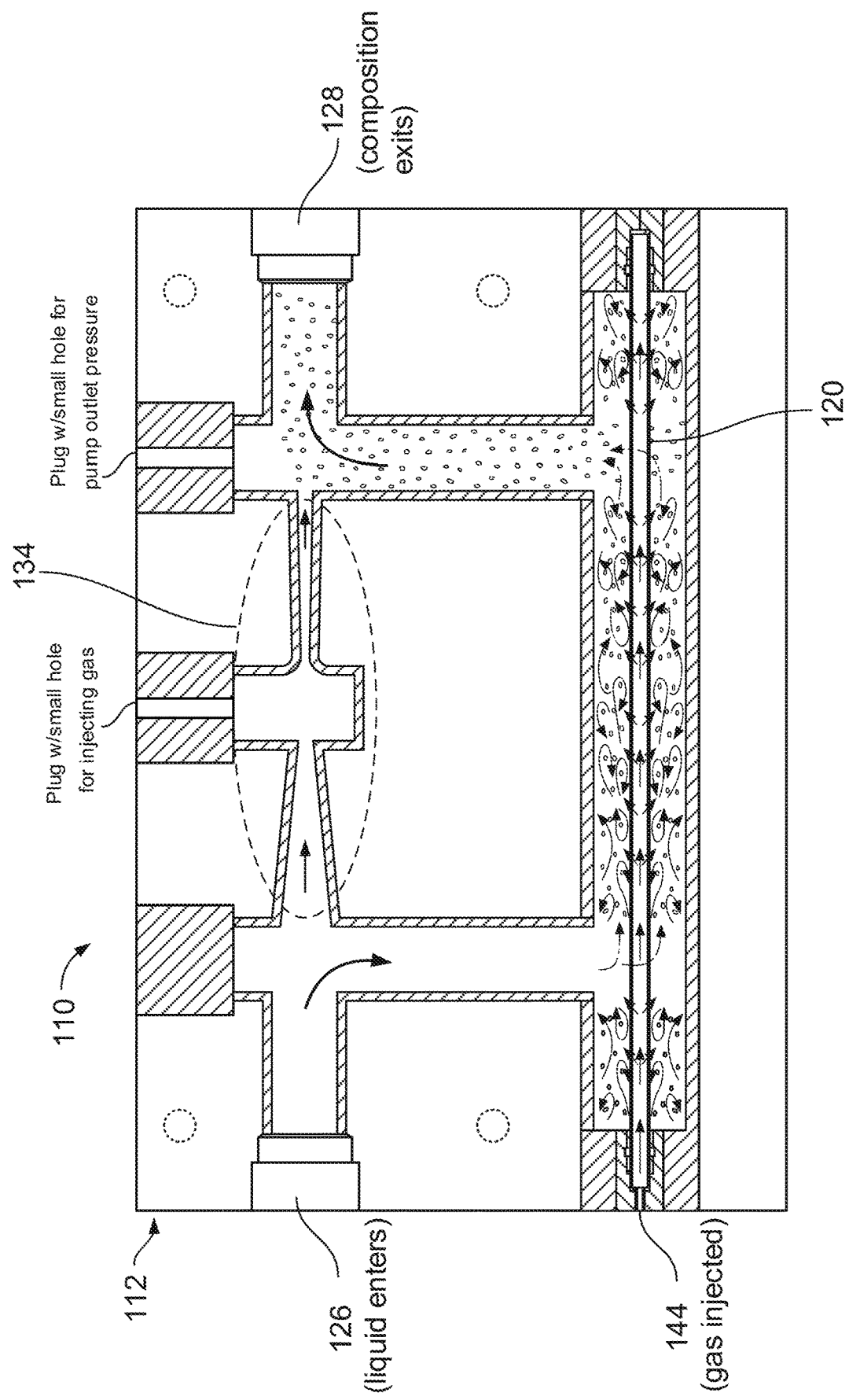
FIG. 3 is a schematic illustration of a third example apparatus for producing a composition that includes nano-bubbles dispersed in a liquid carrier.

Referring to FIG. 3, another example of an apparatus 110 includes a jet pump 134 integrated into a housing 112. The depicted jet pump 134 is located between an inlet 126 and an outlet 128 of the housing 112. The jet pump 134 includes a jet pump inlet for optionally introducing a gas and a nozzle for producing high velocity fluid flow. Integration of the jet pump 134 into the housing 112 can be beneficial in further reducing bubble size of the bubbles contained in a composition containing a liquid carrier and nano-bubbles. The jet pump discharge can produce a high velocity fluid flow for breaking up and mixing bubbles of a composition exiting the outlet 128 of the housing 112.

The apparatus 110 (or apparatus 10) produces compositions containing a liquid carrier and nano-bubbles dispersed therein by forcing the gas from an inlet 144 and through the tube 120 at a high rate. Because it is desirable to reduce the coalescence of, or growth of bubbles on or close to the surface of the tube 120, the apparatus 110 provides a flow rate of the liquid that is significantly higher than the turbulent threshold of the liquid (e.g., a flow rate above 2.0 m/s). The turbulent flow performs two functions that includes a) shearing nascent bubbles from the surface of the tube 120; and b) removing newly formed bubbles from the vicinity of the surface of the tube 120. The turbulence within the housing 112 of the apparatus 110 achieves both of these objectives. As an example, FIG. 1 illustrates the movement of the liquid (depicted by arrows) within the housing 112 under turbulent flow conditions.

Any of the compositions produced by the apparatuses and methods described herein include nano-bubbles having a mean diameter less than 1 micron. In some embodiments, the nano-bubbles have a mean diameter ranging from about 10 nm to about 500 nm, about 75 nm to about 200 nm, or about 50 nm to about 150 nm. The nano-bubbles in the composition may have a unimodal distribution of diameters, where the mean bubble diameter is less than 1 micron.

The compositions provided herein include a high concentration of nano-bubbles dispersed in the liquid carrier. In some embodiments, the composition includes a concentration of nano-bubbles in the liquid carrier at the liquid outlet is at least $1 \times 10^6$ nano-bubbles/ml, at least $1 \times 10^7$ nano-bubbles/ml, or at least $1 \times 10^8$ nano-bubbles/ml.

The apparatus and method provided herein can produce compositions in which the liquid carrier contains nano-bubbles that remain stable over a desired time. In some embodiments, the composition provided herein contain nano-bubbles that are stable in the liquid carrier for at least one month, and preferably at least 3 months, under ambient pressure and temperature.

The above-described nano-bubble containing compositions are useful in a number of applications. Because the nano-bubbles are stable in the liquid carrier, they may be transported for long distances without dissolving or coalescing in the liquid carrier. Moreover, because the concentration of nano-bubbles in the liquid composition is high, the nano-bubbles are an efficient source for transporting gas to a desired source. In addition, with a smaller surface area and high solubility, compositions containing nano-bubbles are many times more efficient at transferring gases such as oxygen into liquid than conventional aeration.

One application involves water treatment where the composition containing nano-bubbles dispersed in a liquid carrier is transported to a source of water in need of treatment. Examples of water that can be treated include wastewater, oxygen-deficient water, drinking water, and aquaculture water. In the case of drinking water, the nano-bubble can be used to create potable water. The nano-bubbles can also be used in carbonated drinking water.

One particularly useful water treatment application involves environmental water remediation. Because the nano-bubbles having a prolonged lifespan in water and significant mixing potential, the compositions can be used to remediate the ecological balance of lakes, rivers, and the ocean. Enriching water bodies with an abundance of oxygen can help restore beneficial aerobic activity that works to breakdown sludge, hydrogen sulfide, environmental toxins, and pathogenic organisms.

Another application involves transporting liquids such as crude oil or drilling fluids through pipes. Often these liquids are viscous and must be transported over significant distances. The composition containing nano-bubbles dispersed in a liquid carrier may be combined with the liquid to create a pumpable composition having a viscosity that is less than the viscosity of the liquid to create a pumpable composition that can be transported through a pipe to a desired destination.

Another application involves treating plant roots to promote plant growth. For example, the composition containing nano-bubbles dispersed in a liquid carrier can be combined with another liquid to create an oxygen-enriched composition that is then applied to plant roots. Similarly, the compositions containing nano-bubbles in a liquid carrier can be used in aquaculture to create a hyperoxic environment that promotes fish and crustacean growth.

Another application involving improving heat transfer. For example, heating or cooling liquids injected with compositions containing nano-bubbles in a liquid carrier can create faster rates of temperature changes in those liquids. A non-limiting exemplary application includes a cooling tower application.

Another application involves using the compositions containing nano-bubbles in a liquid carrier for sterilization. As the nano-bubbles collapse, oxygen is activated in the air and forms molecules such as $O_3$ and OH—. These molecules are potent sterilizers that can be used to destroy pathogenic organisms and certain volatile organic compounds.

Another application involves tissue preservation. Combining the nano-bubble composition with tissue cells can preserve the cells even after freezing.

Another application involves vaporization. Compositions containing the nano-bubbles dispersed in a liquid carrier have a higher vaporization potential than ordinary water. Thus, combining water in cooling towers with the nano-bubble compositions can enhance the vaporization of cooling tower waters and improve the efficiency of associated cooling processes.

Another application involves using the nano-bubble compositions to treat membranes or geothermal wells. When membranes or geothermal wells are continuously exposed to the compositions containing nano-bubbles in a liquid carrier, the compositions can prevent contaminant buildup on the membrane or geothermal well surface. This is due to the fact that the nano-bubbles are negatively charged and can form geometric structures (e.g., lattices) on the membrane or geothermal well surface that exclude certain contaminants, such as salt or organic contaminants.

A number of embodiments of the invention have been described. Nevertheless, it will be understood that various modifications may be made without departing from the spirit and scope of the invention. Accordingly, other embodiments are within the scope of the following claims.

What is claimed is:

1. A method for producing a composition comprising nano-bubbles dispersed in a liquid carrier using an apparatus comprising:
   (a) an elongate housing comprising a first end and a second end, the housing defining a liquid inlet, a liquid outlet, and an interior cavity adapted for receiving the liquid carrier from a liquid source; and
   (b) a gas-permeable member at least partially disposed within the interior cavity of the housing, the gas-permeable member comprising an open end adapted for receiving a pressurized gas from a gas source, a closed end, and a porous sidewall extending between the open and closed ends having a mean pore size no greater than 1.0 μm, the gas-permeable member defining an inner surface, an outer surface, and a lumen, the liquid inlet of the housing being arranged to introduce the liquid carrier from the liquid source into the interior cavity of the housing, the housing and gas-permeable member being configured such that pressurized gas introduced into the lumen of the gas-permeable member is forced through the porous sidewall of the gas-permeable member and onto the outer surface of the gas permeable member in the form of nano-bubbles as the liquid carrier from the liquid source flows parallel to the outer surface of the gas-permeable member from the liquid inlet to the liquid outlet, forming a composition comprising the liquid carrier and the nano-bubbles dispersed therein, the method comprising:

introducing a liquid carrier from a liquid source into the interior cavity of the housing through the liquid inlet of the housing at a flow velocity of at least 2 m/s that creates turbulent flow above the turbulent threshold at the outer surface of the gas-permeable member; and introducing a pressurized gas from a gas source into the lumen of the gas-permeable member at a gas pressure selected such that the pressure within the lumen is greater than the pressure in the interior cavity of the housing, thereby forcing gas through the porous sidewall and forming nano-bubbles on the outer surface of the gas-permeable member, wherein the liquid carrier flowing parallel to the outer surface of the gas-permeable member from the liquid inlet to the liquid outlet removes nano-bubbles from the outer surface of the gas-permeable member to form a composition comprising the liquid carrier and the nano-bubbles dispersed therein.

2. The method of claim 1, wherein the composition is essentially free of microbubbles when measured 10 minutes after emerging from the liquid outlet.

3. The method of claim 1, wherein the nano-bubbles have a mean diameter less than 500 nm.

4. The method of claim 1, wherein the nano-bubbles have a mean diameter less than 200 nm.

5. The method of claim 1, wherein the nano-bubbles have a mean diameter ranging from about 10 nm to about 500 nm.

6. The method of claim 5, wherein the nano-bubbles have a mean diameter ranging from about 75 nm to about 200 nm.

7. The method of claim 1, wherein a concentration of nano-bubbles in the liquid carrier at the liquid outlet is at least $1 \times 10^6$ nano-bubbles/ml.

8. The method of claim 1, wherein a concentration of nano-bubbles in the liquid carrier at the liquid outlet is at least $1 \times 10^7$ nano-bubbles/ml.

9. The method of claim 1, wherein a concentration of nano-bubbles in the liquid carrier at the liquid outlet is at least $1 \times 10^8$ nano-bubbles/ml.

10. The method of claim 1, wherein the composition comprises nano-bubbles that are stable in the liquid carrier for at least one month under ambient pressure and temperature.

11. The method of claim 10, wherein the composition comprises nano-bubbles that are stable in the liquid carrier for at least three months under ambient pressure and temperature.

12. The method of claim 1, wherein the gas is selected from the group consisting of air, oxygen, carbon dioxide, nitrogen, hydrogen, and combinations thereof.

13. The method of claim 1, wherein the pressurized gas is pressurized to at least 5 psi.

14. The method of claim 1, wherein the pressurized gas is pressurized to at least 100 psi.

15. The method of claim 1, wherein the liquid carrier comprises water.

16. The method of claim 1, wherein the liquid carrier is free of surfactants.

17. The method of claim 1, wherein the gas-permeable member comprises a rigid, ceramic member.

18. The method of claim 1, wherein the porous sidewall has a mean pore size ranging from 0.0009 µm to 1 µm.

19. The method of claim 1, wherein the porous sidewall comprises a porous coating.

20. The method of claim 19, wherein the porous coating comprises a metallic oxide.

21. The method of claim 20, wherein the metallic oxide is selected from the group consisting of alumina, titania, zirconia, manganese, and combinations thereof.

22. The method of claim 19, wherein the porous coating is disposed on the inner surface, outer surface, or both surfaces of the gas-permeable member.

23. The method of claim 1, wherein the housing comprises a plurality of gas-permeable members.

24. The method of claim 1, wherein the gas-permeable member comprises a single channel tube.

25. The method of claim 1, wherein the gas-permeable member comprises a multi-channel tube.

26. The method of claim 1, wherein the apparatus comprises one or more helical members adapted for enhancing turbulence in the liquid carrier.

27. The method of claim 1, wherein the apparatus further comprises a jet pump that is integral with the housing.

28. The method of claim 1, wherein the liquid inlet of the housing is arranged to introduce the liquid carrier from the liquid source into the interior cavity of the housing at an angle that is generally orthogonal to the outer surface of the gas permeable member.

* * * * *